United States Patent [19]

Oldham et al.

[11] 4,199,156
[45] Apr. 22, 1980

[54] SEALING RING FOR DRILLING TOOL CUTTERS

[75] Inventors: Joel S. Oldham, San Juan Capistrano; Timothy L. Landerville, Lomita, both of Calif.

[73] Assignee: Smith International, Inc., Newport Beach, Calif.

[21] Appl. No.: 901,148

[22] Filed: Apr. 28, 1978

[51] Int. Cl.² .............................................. F16C 33/76
[52] U.S. Cl. .................................... 277/92; 308/8.2
[58] Field of Search ................. 277/81 P, 92, 93 SD, 277/96.1, 136; 308/8.2

[56] References Cited

U.S. PATENT DOCUMENTS

| | | | |
|---|---|---|---|
| 2,744,774 | 5/1956 | Wist | 277/96.1 |
| 2,916,332 | 12/1959 | Paulecka | 277/96.1 |
| 3,529,840 | 9/1970 | Durham et al. | 277/92 |
| 3,761,145 | 9/1973 | Schumacher | 277/92 |
| 3,827,701 | 8/1974 | Sakamaki | 277/81 P |
| 3,913,988 | 10/1975 | Scales | 308/8.2 |
| 4,068,708 | 1/1978 | Sakaki | 277/92 |

*Primary Examiner*—Robert I. Smith

[57] ABSTRACT

An earth boring tool having journals with rotary cone cutters thereon wherein an internal lubricant exerts pressure on one side of the sealing means and pressurized drilling mud exerts external pressure against outwardly accessible portions of the sealing means, the sealing means having sealing contact with the journal leg or support axially of the journal and also with the rotary cone cutter radially of the journal and the cutter, and the sealing means being constructed and arranged to maintain sealing engagement with one of the journal leg and cutter as the cutter tilts relative to the axis of the journal in the normal operation of the earth boring tool.

19 Claims, 7 Drawing Figures

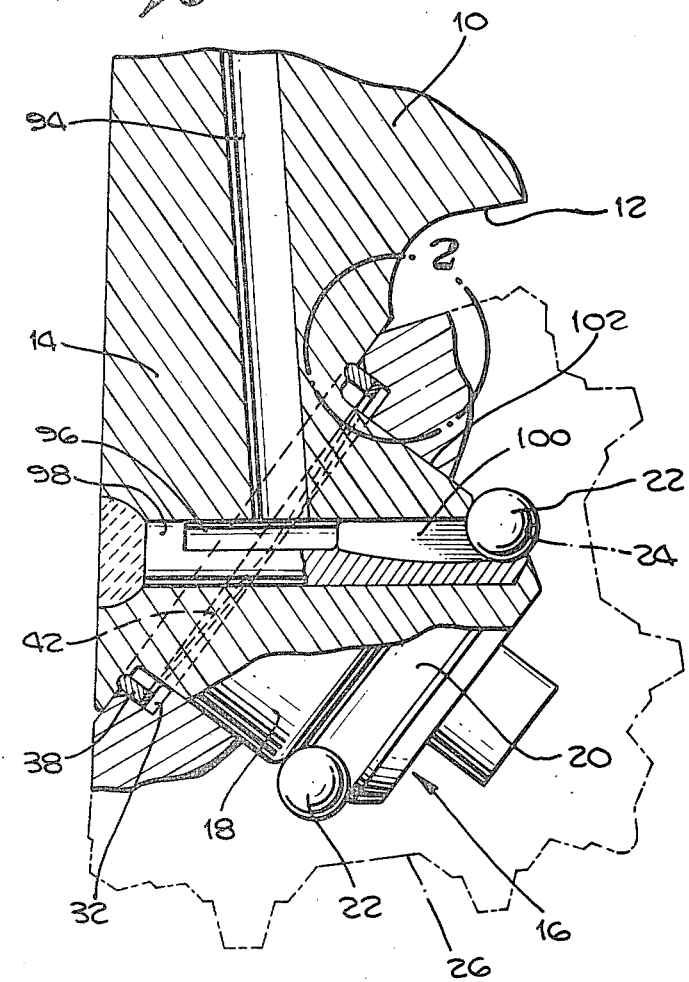
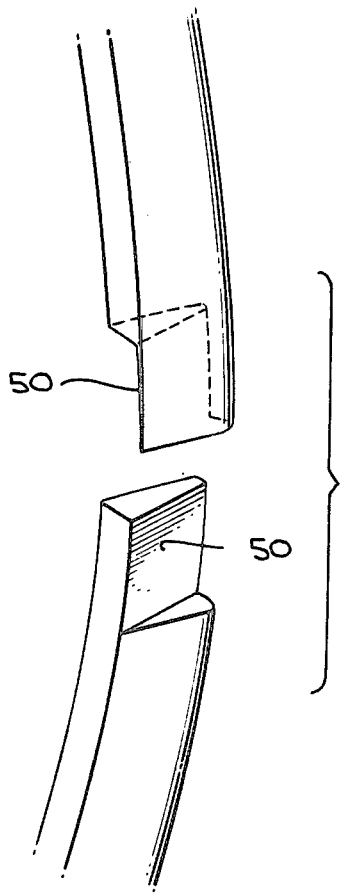
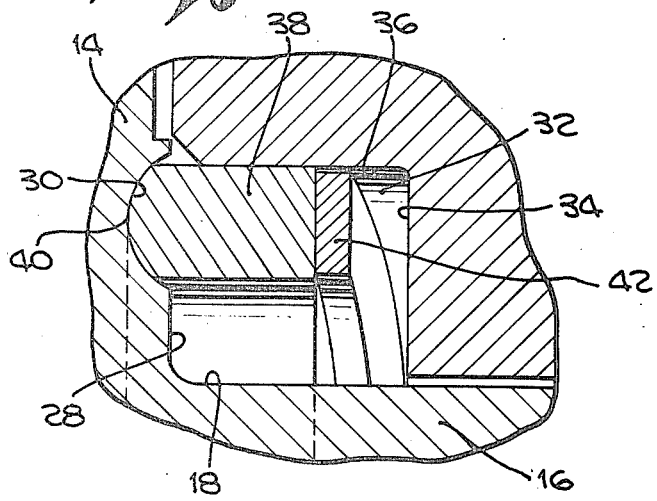

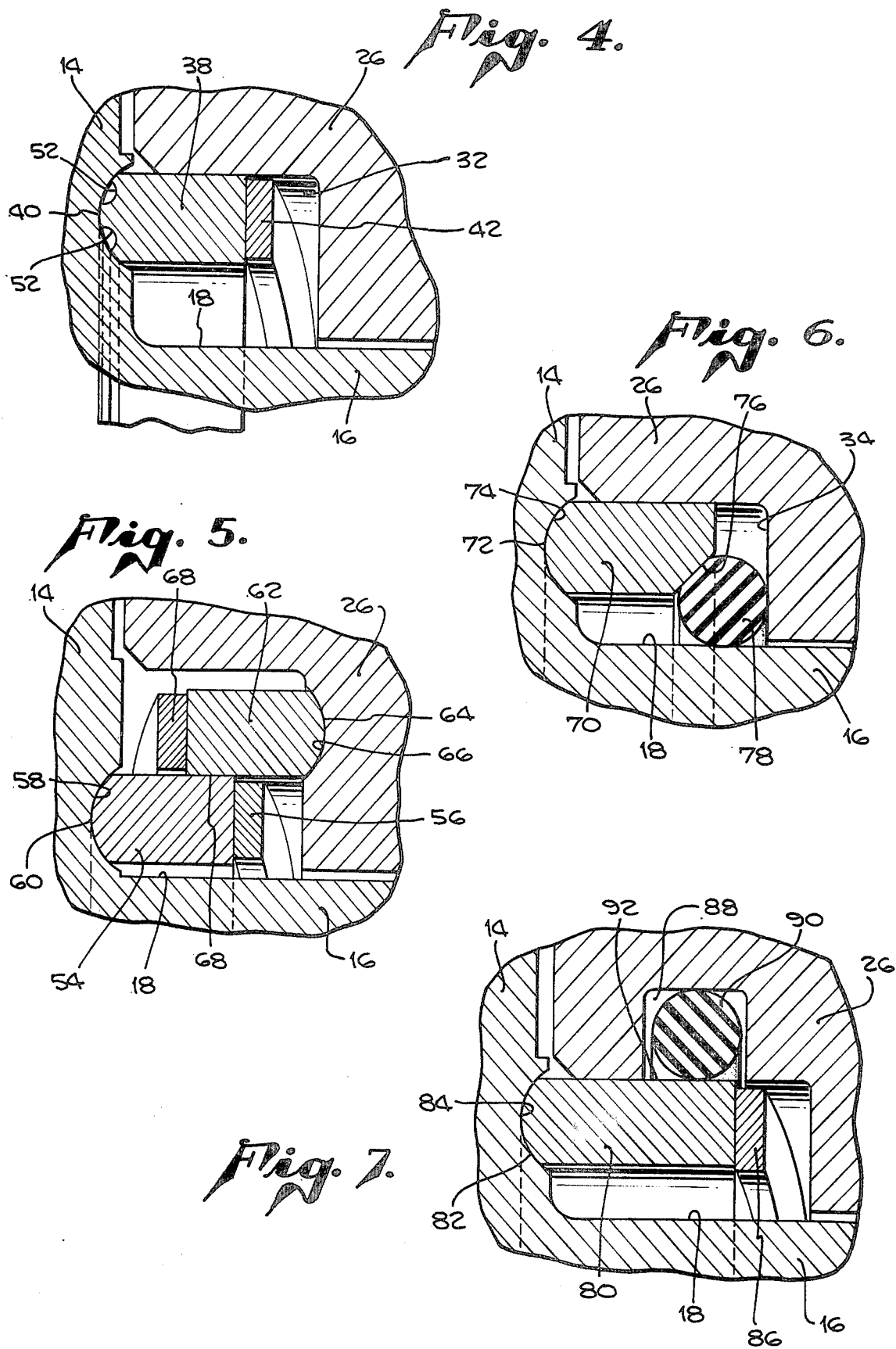

4,199,156

SEALING RING FOR DRILLING TOOL CUTTERS

FIELD OF THE INVENTION

Earth boring tools in which the invention may be incorporated are primarily intended to be rotary drill bits with one or more cutters on journals cantilevered from journal legs extending downwardly beneath the bit bodies. However, it is contemplated that the invention can be embodied in other devices such as big hole boring machines and tunneling machines.

In drilling the earth as in oil and gas well drilling, it is customary to circulate drilling mud down into the hole and then back to the surface to carry off particles of formation from the hole bottom. This drilling mud is under pressure to provide return circulation and the externally exposed portions of the sealing means between the rotary cone cutters and their journals are subject to the pressure of the mud and must prevent its entry and that of formation particles carried thereby, from working past the seal to the interior of the rotary cutters. Other parts of the sealing means are exposed to internal pressures from lubricants which fill the space between the rotary cutters and their respective journals. Therefore the sealing means prevents the drilling mud from contaminating the lubricant and injuring the journal and at the same time prevents pressurized lubricant from escaping.

Because of the clearance fit of rotary cone cutters on their journals, it is difficult to maintain efficient sealing means having a reasonably long effective life. If the sealing means fails or does not function properly, the journal and/or cutter bearing surfaces are destroyed and the bit is rendered worthless. This results in the need to pull the drill string, attach a new bit and lower the string again into the hole. While the cost of the cutter is an expense item, the trip time for pulling and reassembling and lowering the drill string is a far more expensive item. Drilling rigs often cost several thousand dollars an hour and a single trip of a drilling string can consume eight to ten hours time.

It is common to utilize a friction bearing between the journal and rotary cutter, there also being provided a ball-bearing arrangement for friction reduction and for retention of the rotary cutter on the cantilevered journal. Other drilling tools utilize roller bearings between the journal and the cutter. In either case, the drill bit is often provided with a pressurized lubrication system which provides lubricant under pressure between the journal and the cone cutter which rotates thereon. It is difficult to retain this lubricant because the cutter has a slop fit on the journal and its rotational axis tilts relative to the longitudinal axis of the journal.

One of the currently popular types of sealing means is the O-ring. It functions efficiently as a seal, but it has limited life because of the heat generated by the cutters in working against the formation, and frictional heat produced by the rotation of the cutter on the journal and against the O-ring as well as deterioration from abrasive particle intervention.

Conventional metallic sealing rings with flat sealing surfaces do not serve successfully to provide a proper seal because they will tilt with the rotary cutter relative to the journal and its journal leg or the cutter will tilt relative to the sealing ring and drilling mud will leak into and destroy the bearing. Also the lubricant will escape and the bearing will not have its proper lubrication.

The objects and advantages of the invention will appear from the following description in connection with the accompanying drawings.

FIG. 1 is a sectional view through a portion of a journal leg and journal, part of the latter being shown in elevation, an embodiment of the invention being located between the journal leg and journal and a rotary cutter, part of which is in section and part of which is indicated in broken lines;

FIG. 2 is an enlarged sectional detail taken approximately on the broken line 2 of FIG. 1;

FIG. 3 is an enlarged fragmentary view in perspective, of a type of overlap joint for a split sealing ring;

FIG. 4 is an enlarged fragmentary detail of another embodiment of sealing means;

FIG. 5 is an enlarged sectional detail of a dual sealing ring assembly;

FIG. 6 is an enlarged sectional detail of a form utilizing a resilient elastomeric ring for exerting axial and radial sealing pressures;

FIG. 7 is an enlarged fragmentary detail showing sealing means combining a metallic ring and an elastomeric ring.

There is illustrated a portion of a drill bit body 10 having an underside comprising a dome 12 and having a journal leg 14 extending downwardly therefrom. The journal leg has a journal 16 cantilevered therefrom at an inward and downward angle as shown. The journal has a cylindrical friction bearing surface 18 and a concave circumferential portion comprising a ball race groove 20 in which are bearing balls 22 in a cooperating race portion 24 in the cavity of a rotary cone cutter indicated at 26.

In the detail in FIG. 2 the journal leg 14 is shown with a back face 28 with a groove 30 thereabout, outwardly concentric to the journal 18 and its central axis. The rotary cutter 26 has a circular relieved portion providing a circular space 32 with an axially facing surface 34 spaced from and opposed to the journal leg back face 28. The circular space 32 is also defined by a radially inwardly facing surface 36 which is opposed to and outwardly concentric to the cylindrical surface 18 of the journal 16.

Within the space 32 which may be identified as a seal confine, is a sealing ring 38 having a cross-sectionally curved surface 40 which is opposed to and in contact with the concave surface 30 of the journal leg back face 28. While the two curved surfaces 30 and 40 are shown to be on complementary arcs, it is to be understood that these curved surfaces may be arcuate or otherwise curved transversely of the surfaces so that if the sealing ring 38 is tilted with respect to the axis of the journal 16, there will be appreciable sealing contact maintained between surfaces 30 and 40. Suitable spring means such as a wave spring 42 is interposed between the cone cutter surface 34 and the ring 38 to urge the ring surface 40 against the journal leg back face surface 30 in a direction axially of the journal 16.

The sealing ring 38 preferably is split at one point. A perspective detail of the adjacent ends of the ring at the split is found in FIG. 3. Each end has a portion cut away from the outside of the ring as at 44 to receive an appropriately shaped projecting end portion 46 on the other adjacent end of the ring. This is a known commercial split ring overlap and it provides sealing in both an axial and a radial direction.

FIG. 5 shows an arrangement as in FIGS. 1 and 2. However, in FIG. 5 the sealing ring 38 is provided with lubricant retaining grooves 52 about the curved sealing surface 40.

FIG. 6 is a detail in section of another type of sealing means which incorporates a sealing ring 54 with a wave spring 56 which urges the ring axially to the left as viewed in FIG. 6 to maintain the curved sealing surfaces 58 and 60 in sealing engagement. Outwardly concentric to the sealing ring 54 is a sealing ring 62 having a transversely curved sealing surface 64 in sealing engagement with a cooperatively curved surface 66 in the rotary cone 26. The ring 62 is urged axially by a wave spring 68 away from the journal leg 14 and against the rotary cone cutter. The sealing rings 54 and 62 have opposed sealing surfaces which meet at 68.

FIG. 7 shows an embodiment wherein there is a metallic sealing ring 70 having a curved sealing surface 72 in sealing engagement with an oppositely curved sealing surface 74 in the rear face of the journal leg 14. Instead of a wave spring as shown in the previously described embodiments, the metal sealing ring 70 is provided with a beveled surface 76. A deformable elastomeric ring such as an O-ring 78 is cramped between the cylindrical journal surface 18 and the cone cutter surface 34 and bears against the beveled surface 76 of the sealing ring to urge said ring both axially and radially outwardly.

In the embodiments thus far described, the metallic sealing rings 38, 54, 62 and 70 preferably are split rings. Adjacent portions of the rings at the split should overlap by any suitable means such as the structures shown in FIGS. 3 and 4. However, in FIG. 8 there is shown an arrangement wherein the sealing ring 80 is continuous, without a transverse split. It is provided with a curved edge 82 to provide sealing contact with a complementary oppositely curved surface 84 in the rear face of the journal leg 14. The ring is urged axially toward the journal leg 14 by a suitable spring such as the wave spring 86. The rotary cutter 26 however, is provided with an inwardly open circular gland 88 adapted to receive an O-ring 90 which forms a seal against the outer circumferential surface 92 of the continuous sealing ring 80.

Inasmuch as a metallic sealing ring does not have the ability to conform to surfaces while under pressure as do elastomers, mating surfaces of the sealing rings and the journal leg and rotary cutter should be lapped or constructed of a material that exhibits self-lapping properties.

In FIG. 1 there is shown a pressurized lubricant supply conduit 94 which communicates with a bore 96 within which is a ball retainer 98 having a relieved portion 100 which permits the flow of lubricant to the bearing balls 22 and the space 102 between the journal 16 and the rotary cutter 26. Lubricant flows through the conduit 94 from a lubricant reservoir of conventional type which is externally pressurized in a manner well-known in the art and the reservoir and pressure means are therefore not shown. The lubricant in each case exerts pressure against one side of the sealing means. The opposite side of the sealing means is exposed to pressures from drilling mud in the hole being drilled on the outside of the drill bit and its cutters.

There are some conditions under which the pressure of the drilling mud in the hole exteriorly of the bit and its cutters is greater or less than the internal pressure of the lubricant. There might be fluctuations in the pressure differential of the drilling mud and the lubricant and at times the pressures may be equalized. Regardless of these variables, the sealing means will efficiently function to exclude the drilling mud and formation particles and contain the pressurized lubricant.

The rotary cutters on drill bits have a certain amount of slop when they are new. As the journal and rotary cutter bearing surfaces wear the relative movement or slop becomes greater. The cutter tilts to a greater angle relative to the axis of the journal. However, the complementary curved surfaces on the sealing rings and either the journal leg rear face or a surface on the rotary cutter or both permit this angular displacement of the rotary cutters in frequently varying degrees while maintaining the proper seal relationship between the rotating cutters, their journals and the journal leg rear faces.

While the sealing rings are intended to seal statically relative to the rotary cones, in the operation of a drilling bit, static sealing may alternate between the cone and the journal leg rear face. However, initial positioning of the sealing means and the resilient force of the springs or the O-rings of FIG. 7 provide initial positioning of the sealing ring means until internal lubricant pressures seal the ring off.

It should be understood that changes can be made in the form, details, arrangement and proportions of the various parts without departing from the spirit of the invention.

What is claimed is:

1. An earth boring tool for use with a pressurized down hole drilling fluid comprising:
   a bit body having a journal leg with a back face and having a journal extending therefrom,
   a rotary cutter having a journal cavity and mounted for rotation on said journal,
   the journal cavity of said cutter providing radial clearance from said journal, whereby said cutter, in operation, tilts upon its axis and relative to said journal,
   said rotary cutter having a portion defining part of a seal confined which is also comprised, in part, by said journal leg back face,
   metallic sealing ring means lying in said sealed confine about said journal and including a circumferential band-like surface of revolution,
   said surface of revolution of said sealing ring means being in metal-to-metal sealing contact with one of said journal leg and cutter,
   said metallic sealing ring means having an axially disposed sealing surface in metal-to-metal sealing contact with the other of said journal leg and rotary cutter, and one of said sealing surfaces in metal-to-metal contact, and the surface with which it is in contact being curved to accommodate the tilt of said cutter.

2. The structure in claim 1, and resilient means biasing said sealing ring means axially toward said back face.

3. The structure in claim 1, and said back face having an axially disposed sealing surface outwardly concentric to said journal,
   and said sealing ring means engaging said back face sealing surface with a lapped fit.

4. The structure in claim 1, and said back face having a cross-sectionally curved sealing surface outwardly concentric to said journal,
   and said sealing ring means, having a cross-sectionally curved sealing surface in sealing engagement with the cross-sectionally curved sealing surface of said back face.

5. The structure in claim 3, and the cross-sectionally curved sealing surfaces being substantially arcuate.

6. The structure of claim 1, and said journal back face and the adjacent portions of said sealing ring means having unbroken complementary concavo-convex sealing surfaces, the radially outer surface of said sealing ring means having its major area in sealing contact with said rotary cutter, and an axially acting wave spring between a portion of said rotary cutter and said sealing ring means to bias the sealing ring against said back face.

7. The structure in claim 1, and said rotary cutter having a radially inwardly facing sealing surface comprising part of said seal confine portion, and said sealing ring means having an outer circumferential face in sealing engagement with the radially inwardly facing sealing surface of said rotary cutter.

8. The structure of claim 7, and resilient means in said confine engaging and biasing said sealing ring means against said journal leg back face.

9. The structure in claim 8, and said resilient means comprising a wave spring.

10. The structure in claim 8, and said resilient means comprising an elastomeric element.

11. The structure in claim 10, and said elastomeric element comprising an O-ring.

12. The structure in claim 11, and said metallic sealing ring means having a wedge surface directed generally axially and radially of the ring, and said O-ring being cramped in said seal confine and engaging and biasing said metallic sealing ring means axially toward said journal back face and also toward said radially inwardly facing sealing surface of said cutter.

13. The structure in claim 12, and said O-ring also being in sealing engagement with said journal.

14. The structure in claim 13, and said O-ring also being in sealing engagement with said rotary cutter adjacent said radially inwardly facing sealing surface.

15. The structure in claim 2, and said resilient means comprising an elastomeric seal in said seal confine and biasing said metallic sealing ring against said journal leg back face, and said metallic sealing ring also sealing off said elastic ring from exposure to drilling mud.

16. The structure in claim 1, and spring means in said seal confine biasing said metallic sealing ring means axially into sealing engagement with said journal leg back face, a radially inwardly open second seal confine formed in said rotary cutter about said metallic sealing ring means, and an O-ring in said second seal confine forming a second seal between said metallic sealing ring means and said rotary cutter.

17. The structure in claim 1, and said metallic sealing ring means being split at one point, and at said split, adjacent portions of the sealing ring means being overlapped and providing a radially and an axially sealing at said split.

18. The structure in claim 1, and said metallic sealing ring means being continuous, and lapped surfaces on said sealing ring means and said rotary cutter in sealing relationship with each other.

19. The structure in claim 18, and a radially inwardly open second seal confine formed in said rotary cutter about said metallic sealing ring means, and an O-ring in said second seal confine forming a second seal between said metallic sealing ring means and said rotary cutter.

* * * * *